United States Patent
Jang et al.

(10) Patent No.: US 10,562,593 B2
(45) Date of Patent: Feb. 18, 2020

(54) FRICTIONAL RESISTANCE-REDUCING DEVICE AND SHIP INCLUDING SAME

(71) Applicant: SAMSUNG HEAVY INDUSTRIES CO., LTD., Seoul (KR)

(72) Inventors: Jin Ho Jang, Gyeongsangnam-do (KR); Sang Min Kim, Gyeongsangnam-do (KR); Soon Ho Choi, Gyeongsangnam-do (KR); Jong Oh Kwon, Gyeongsangnam-do (KR); Boo Ki Kim, Gyeongsangnam-do (KR); Hee Taek Kim, Gyeongsangnam-do (KR); Dong Yeon Lee, Gyeongsangnam-do (KR); Jae Doo Lee, Gyeongsangnam-do (KR)

(73) Assignee: SAMSUNG HEAVY INDUSTRIES CO., LTD., Seoul (KR)

( * ) Notice: Subject to any disclaimer, the term of this patent is extended or adjusted under 35 U.S.C. 154(b) by 0 days.

(21) Appl. No.: 15/780,600

(22) PCT Filed: Jan. 8, 2016

(86) PCT No.: PCT/KR2016/000200
§ 371 (c)(1),
(2) Date: May 31, 2018

(87) PCT Pub. No.: WO2017/094961
PCT Pub. Date: Jun. 8, 2017

(65) Prior Publication Data
US 2018/0354587 A1    Dec. 13, 2018

(30) Foreign Application Priority Data
Dec. 4, 2015  (KR) .................. 10-2015-0172180

(51) Int. Cl.
*B63B 1/38* (2006.01)
*B63B 1/08* (2006.01)

(52) U.S. Cl.
CPC .................. *B63B 1/38* (2013.01); *B63B 1/08* (2013.01); *B63B 2001/387* (2013.01); *Y02T 70/122* (2013.01); *Y02T 70/128* (2013.01)

(58) Field of Classification Search
CPC ....... B63B 1/38; B63B 1/08; B63B 2001/387; Y02T 70/122; Y02T 70/128
See application file for complete search history.

(56) References Cited

U.S. PATENT DOCUMENTS

| 5,456,201 A | 10/1995 | Bobst | |
| 8,763,547 B2* | 7/2014 | Costas | F04F 5/54 114/67 A |
| 2011/0239927 A1 | 10/2011 | Kawakita et al. | |

FOREIGN PATENT DOCUMENTS

| CN | 102202961 A | 9/2011 |
| CN | 104254478 A | 12/2014 |

(Continued)

OTHER PUBLICATIONS

World Intellectual Property Organization, International Search Report for international application No. PCT/KR2016/000200, dated Aug. 24, 2016, 2 total pages.

(Continued)

*Primary Examiner* — Stephen P Avila
(74) *Attorney, Agent, or Firm* — SoCal IP Law Group LLP; Mark A. Goldstein

(57) ABSTRACT

Disclosed are a frictional resistance reducing device that effectively reduces the frictional resistance of a ship, and a ship including same. The frictional resistance reducing device comprises: a first air discharge part formed on the leading undersurface of a ship and discharging air into water; a second air discharge part formed behind the first air (Continued)

discharge part and discharging air into water; and an air supplying source supplying air to the first air discharge part and the second air discharge part, wherein the first air discharge part and the second air discharge part are disposed in-line along the lengthwise direction of the ship, and at least a portion of a first air discharge period of the first air discharge part and at least a portion of a second air discharge period of the second air discharge part overlap each other.

14 Claims, 10 Drawing Sheets

(56) References Cited

FOREIGN PATENT DOCUMENTS

| | | |
|---|---|---|
| EP | 2388188 A1 | 11/2011 |
| JP | 10-175588 | 6/1998 |
| JP | 2000025683 A | 1/2000 |
| JP | 2000-128062 | 5/2000 |
| JP | 2008114710 A | 5/2008 |
| JP | 2009-248831 | 10/2009 |
| JP | 2012-001115 | 1/2012 |
| JP | 2012133625 A | 7/2012 |
| JP | 2014012443 A | 1/2014 |
| KR | 10-1249166 | 3/2013 |
| KR | 10-2011-0050534 | 6/2014 |
| KR | 10-2014-0145775 | 12/2014 |
| KR | 10-2013-0019439 | 4/2015 |
| KR | 10-1532852 | 6/2015 |
| WO | 2017094961 A1 | 6/2017 |

OTHER PUBLICATIONS

Japanese Intellectual Property Office, Office Action for Japanese Application No. JP 2018-527166, dated May 27, 2019, 8 total pages.
European Intellectual Property Office, European Search Report for Application No. EP16870858, dated May 16, 2019, 8 total pages.
Chinese Intellectual Property Office, Office Action for Chinese application No. 201680070936.9, dated Apr. 4, 2019, 8 total pages.

* cited by examiner ness of the hull, and at least part of a first air discharge period of the first air discharge part and at least part of a second air discharge period of the second air discharge part overlap each other.

FRICTIONAL RESISTANCE-REDUCING DEVICE AND SHIP INCLUDING SAME

RELATED APPLICATION INFORMATION

This patent claims priority from International PCT Patent Application No. PCT/KR2016/000200, filed Jan. 8, 2016 entitled, "FRICTIONAL RESISTANCE REDUCING DEVICE AND SHIP INCLUDING SAME", which claims priority to Korean Patent Application Nos. 10-2015-0172155, filed Dec. 4, 2015, and 10-2015-0172180, filed Dec. 4, 2015 all of which are incorporated herein by reference in their entirety.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

The present disclosure relates to a frictional resistance reducing device and a ship including the same.

Background Art

An air lubrication system is known as a technology for improving the efficiency of navigation of a ship. The air lubrication system forms an air layer on a bottom surface of a hull by discharging air to an outer surface below a waterline of the hull and reduces the frictional resistance between the ship and water by using the air layer, thereby improving the efficiency of navigation. The technology disclosed in Japanese Laid-Open Patent Publication No. 2009-248831 is an example of the air lubrication system.

DISCLOSURE

Technical Problem

Aspects of the present disclosure provide a frictional resistance reducing device which effectively reduces the frictional resistance of a ship.

Aspects of the present disclosure also provide a ship in which the frictional resistance reducing device is installed.

Technical Solution

According to an aspect of the present disclosure, there is provided a frictional resistance reducing device including: a first air discharge part which is formed on a bottom surface of a hull and discharges air into water; a second air discharge part which is formed behind the first air discharge part and discharges air into the water; and a first air supplying source which supplies air to the first air discharge part or the second air discharge part, wherein the first air discharge part and the second air discharge part are arranged in a line in a length direction of the hull, and at least part of a first air discharge period of the first air discharge part and at least part of a second air discharge period of the second air discharge part overlap each other.

A distance between the first air discharge part and the second air discharge part is smaller than or equal to 0.1 times a full length of the hull.

A width of the first air discharge part is smaller than or equal to a width of the second air discharge part.

The width of each of the first air discharge part and the second air discharge part is smaller than or equal to 0.5 times the width of the hull.

The amount of air discharged from the first air discharge part is smaller than or equal to the amount of air discharged from the second air discharge part.

The first air discharge part and the second air discharge part are disposed closer to a bow than to a stern, and the frictional resistance reducing device further includes a third air discharge part which is formed on the bottom of the hull, is disposed closer to the stern than to the bow and discharges air into the water.

At least part of a third air discharge period of the third air discharge part overlaps at least part of the first air discharge period and at least part of the second air discharge period.

The hull includes twin skegs, and a width of the third air discharge part is smaller than a gap between the twin skegs.

The frictional resistance reducing device further includes a second air supplying source which is spaced apart from the first air supplying source and supplies air to the third air discharge part.

According to another aspect of the present disclosure, there is provided a device for reducing frictional resistance of a hull having twin skegs. The device includes: an air discharge part which discharges air to form an air layer on a bottom inclined part located between the twin skegs and inclined upward toward a stern; and an air supplying source which supplies air to the air discharge part.

The air discharge part is disposed ahead of a boundary between a bottom surface of the hull and the bottom inclined part.

The air discharge part is disposed between a position located 1.5 stations forward from the boundary and the boundary.

The air discharge part is disposed such that a longitudinal centerline of the hull passes through a widthwise center of the air discharge part, and a width of the air discharge part is smaller than a gap between the twin skegs.

One or more additional air discharge parts which are disposed closer to a bow than to the stern of the hull and discharge air to form an air layer on the bottom surface of the hull are formed.

The air discharge part and the additional air discharge parts discharge air simultaneously.

According to another aspect of the present disclosure, there is provided a ship including the frictional resistance reducing device described above.

Advantageous Effects

A frictional resistance reducing device according to embodiments of the present disclosure can significantly reduce frictional resistance by discharging air through a first air discharge part and a second air discharge part arranged in a line with one behind the other.

In addition, in a twin-skeg ship, the frictional resistance reducing device can effectively reduce the frictional resistance of the ship having a twin-skeg hull form by forming an air layer on a bottom inclined part between twin skegs.

DETAILED DESCRIPTION

Mode for Invention

Figure 1:
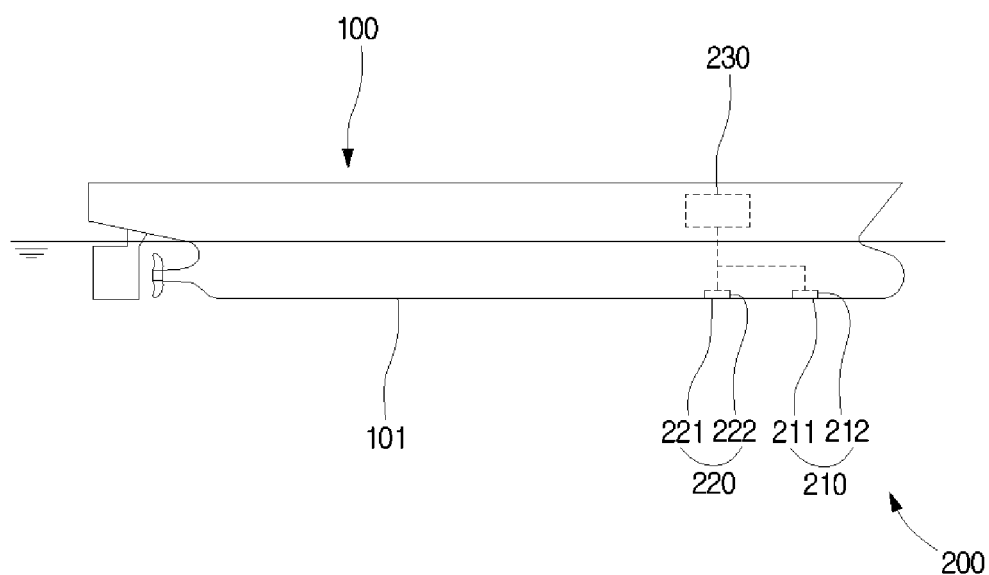
FIG. 1 is a side view of a ship equipped with a frictional resistance reducing device according to a first embodiment of the present disclosure.

Embodiments according to the present disclosure may be variously modified and may have a variety of forms, and thus, specific embodiments are illustrated in the drawings and described in detail herein or in the present application. However, the following description does not limit the present disclosure to specific embodiments and should be understood to include all variations, equivalents, or substitutions within the spirit and scope of the present disclosure. A detailed description might be omitted when it is determined that related prior art or the detailed description of the structure may unnecessarily obscure the point of the present disclosure.

Hereinafter, embodiments of the present disclosure will be described in detail with reference to the accompanying drawings. In the following description with reference to the accompanying drawings, the same or corresponding elements will be assigned the same reference numerals, and a redundant description thereof will be omitted.

Figure 2:
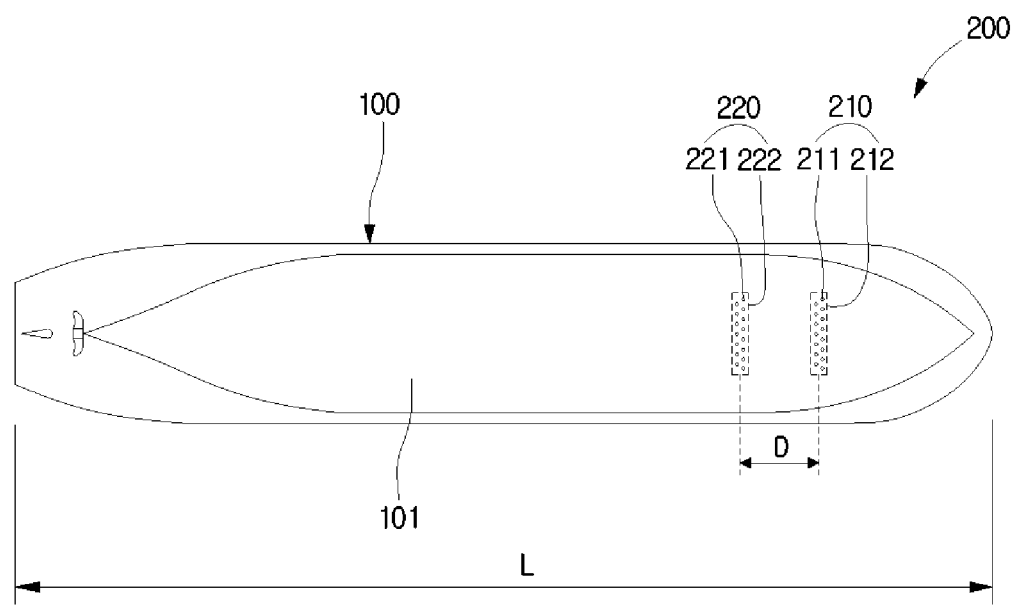
FIG. 2 is a bottom view of the ship equipped with the frictional resistance reducing device according to the first embodiment of the present disclosure.
Figure 3:
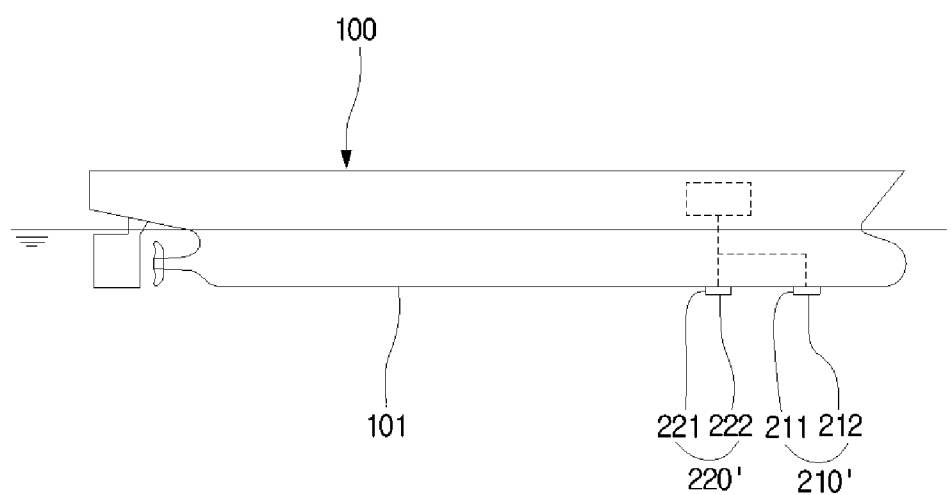
FIG. 3 is a side view of a ship equipped with a frictional resistance reducing device according to a second embodiment of the present disclosure.

FIGS. 1 and 2 are respectively a side view and a bottom view of a ship equipped with a frictional resistance reducing device according to a first embodiment of the present disclosure. FIG. 3 is a side view of a ship equipped with a frictional resistance reducing device according to a second embodiment of the present disclosure.

Referring to FIGS. 1 and 2, the ship 10 equipped with the frictional resistance reducing device according to the first embodiment of the present disclosure includes a hull 100 and the frictional resistance reducing device 200.

The frictional resistance reducing device 200 forms an air layer on a bottom surface 101 of the hull 100 to reduce the frictional resistance of the hull 100.

The frictional resistance reducing device 200 includes a first air discharge part 210, a second air discharge part 220, and a first air supplying source 230.

The first air discharge part 210 is formed on the bottom surface 101 of the hull 100. The first air discharge part 210 discharges air into water. The first air discharge part 210 includes a plurality of air discharge holes 211 and a chamber 212.

The air discharge holes 211 are distributed in the bottom surface 101 to be spaced apart from each other. The air discharge holes 211 may be distributed in a width direction of the hull 100. The air supplied from the first air supplying source 230, which will be described later, is discharged into the water through the air discharge holes 211.

The chamber 212 is disposed inside the hull 100. The chamber 212 may be disposed inside the hull 100 to cover the air discharge holes 211. The air supplied from the first air supplying source 230 flows into the chamber 212 and is discharged into the water through the air discharge holes 211.

Alternatively, referring to FIG. 3, a chamber 212 constituting a first air discharge part 210' may be disposed outside a hull 100. Here, the chamber 212 may be coupled to a bottom surface 101 of the hull 100. In this case, a plurality of air discharge holes 211 may be formed in side surfaces of the chamber 212, and an inlet for introducing air into the chamber 212 may be formed in the bottom surface 101 of the hull 100. In addition, various forms of first air discharge parts can be proposed.

Referring again to FIGS. 1 and 2, the second air discharge part 220 is formed on the bottom surface 101. The second air discharge part 220 discharges air into the water. The second air discharge part 220 is located behind the first air discharge part 210, and the first and second air discharge parts 210 and 220 are arranged in a line in a length direction of the hull 100. A reduction in frictional resistance brought about by the discharge of air from the first air discharge part 210 and the second air discharge part 220 arranged in a line will be described later.

The second air discharge part 220 includes a plurality of air discharge holes 221 and a chamber 222.

The air discharge holes 221 are distributed in the bottom surface 101 to be spaced apart from each other. The air discharge holes 221 may be distributed in the width direction of the hull 100. The air supplied from the first air supplying source 230, which will be described later, is discharged into the water through the air discharge holes 221.

The chamber 222 is disposed inside the hull 100. The chamber 222 may be disposed inside the hull 100 to cover the air discharge holes 221. The air supplied from the first air supplying source 230 flows into the chamber 222 and is discharged into the water through the air discharge holes 221.

Alternatively, referring to FIG. 3, a chamber 222 constituting a second air discharge part 220' may be disposed outside the hull 100. Here, the chamber 222 may be coupled to the bottom surface 101. In this case, a plurality of air discharge holes 221 may be formed in side surfaces of the chamber 222, and an inlet for introducing air into the chamber 222 may be formed in the bottom surface 101. In addition, various forms of second air discharge parts can be proposed.

Referring again to FIGS. 1 and 2, the first air supplying source 230 supplies air to the first air discharge part 210 or the second air discharge part 220. That is, the first air supplying source 230 may supply air only to the first air discharge part 210, supply air only to the second air discharge part 220, or supply air to both the first and second air discharge parts 210 and 220. In FIG. 1, the first air discharge part 210 and the second air discharge part 220 are illustrated as being supplied with air from one first air supplying source 230. However, the first air discharge part 210 and the second air discharge part 220 can also receive air from different air supplying sources. The first air supplying source 230 may be disposed inside the hull 100. The first air supplying source 230 may include a compressor or a blower.

The first air discharge part 210 and the second air discharge part 220 may be arranged closer to a bow than to a stem of the ship 10. Thus, the frictional resistance that can be generated in a traveling direction of the ship 10 can be minimized. In addition, the first air supplying source 230 may be disposed close to the first air discharge part 210 and the second air discharge part 220. That is, the first air supplying source 230 may also be disposed closer to the bow than to the stem of the ship 10. In this case, an air supply pipe can be made short to facilitate the supply of air.

At least part of a first air discharge period of the first air discharge part 210 and at least part of a second air discharge period of the second air discharge part 220 may overlap each other. That is, there is a period during which the first air discharge part 210 and the second air discharge part 220 operate simultaneously. Alternatively, the first air discharge part 210 and the second air discharge part 220 may always discharge air simultaneously. The air discharged from the first air discharge part 210 and the second air discharge part 220 forms an air layer on the bottom surface 101 of the hull 100. The operating periods of the first air discharge part 210 and the second air discharge part 220 can vary depending on the design. In addition, the operating period of the first air discharge part 210 and the operating period of the second air discharge part 220 can be changed as necessary.

When air is discharged simultaneously from the first air discharge part 210 and the second air discharge part 220 arranged in a line with one behind the other, a reduction in frictional resistance is more remarkable than when air is discharged at different times from the first air discharge part 210 and the second air discharge part 220.

Figure 4:
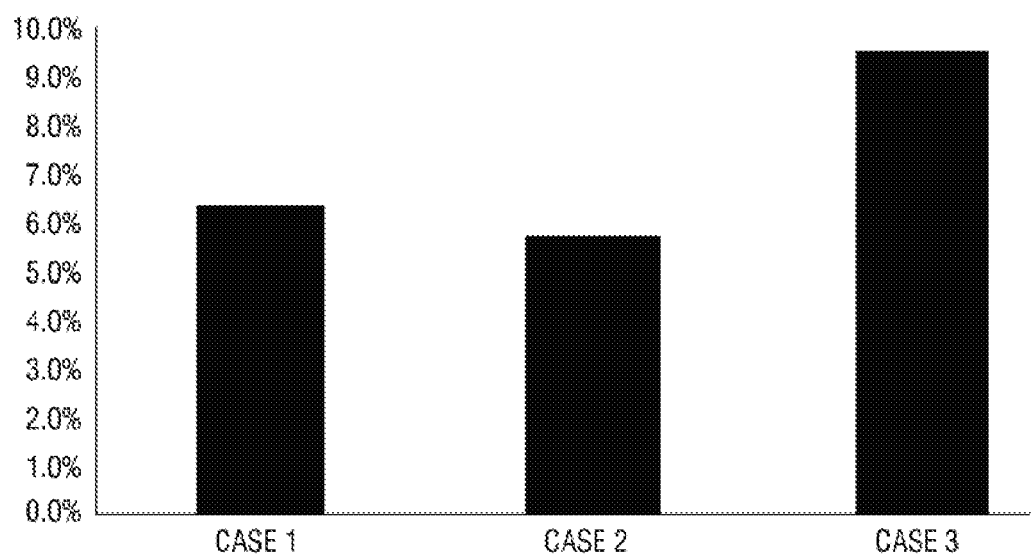
FIG. 4 illustrates experimental data obtained from a first model ship experiment to show the frictional resistance reducing effect of the frictional resistance reducing device according to the first embodiment of the present disclosure.

FIG. 4 illustrates experimental data obtained from a first model ship experiment to show the frictional resistance reducing effect of the frictional resistance reducing device according to the first embodiment of the present disclosure. The frictional resistance reducing effect of the frictional resistance reducing device 200 according to the first embodiment of the present disclosure will now be described with reference to FIG. 4.

For the first model ship experiment, a model ship to which the frictional resistance reducing device 200 according to the first embodiment of the present disclosure was applied was made. On a bottom surface of the model ship, a first air discharge part discharging air into water and a second air discharge part located behind the first air discharge part and discharging air into the water were formed.

In the first model ship experiment, the resistance of the model ship was measured when air was not discharged at all from the first air discharge part and the second air discharge part (reference case), when air was discharged only from the first air discharge part (CASE 1), when air was discharged only from the second air discharge part (CASE 2), and when air was discharged from both the first air discharge part and the second air discharge part (CASE 3).

Here, the amount of air discharged in each of CASE 1, CASE 2 and CASE 3 was the same.

In FIG. 4, the X-axis represents the experimental case, and the Y-axis represents the resistance reduction rate of the model ship in each experimental case. Here, the frictional resistance reduction rate denotes the rate of decrease of the resistance measured in each case with respect to the resistance (hereinafter, referred to as reference resistance) measured in the reference case.

Referring to FIG. 4, the resistance reduction rate with respect to the reference resistance was 6.2% in CASE 1, 5.8% in CASE 2, and 9.5% in CASE 3.

It can be inferred from these figures that the resistance reduction rate in CASE 3 is higher than that in CASE 1 by 48.38% and higher than that in CASE 2 by 58.62%.

These results indicate that even if the same amount of air is discharged, the frictional resistance is reduced more significantly when air is discharged simultaneously from the first air discharge part and the second air discharge part arranged in a line with one behind the other than when air is discharged at different times from the first air discharge part and the second air discharge part.

The frictional resistance reducing device 200 (see FIG. 1) according to the first embodiment of the present disclosure is based on the above experimental data and thus effectively reduces frictional resistance by discharging air simultaneously through the first air discharge part 210 and the second air discharge part 220 arranged in a line with one behind the other.

Figure 5:
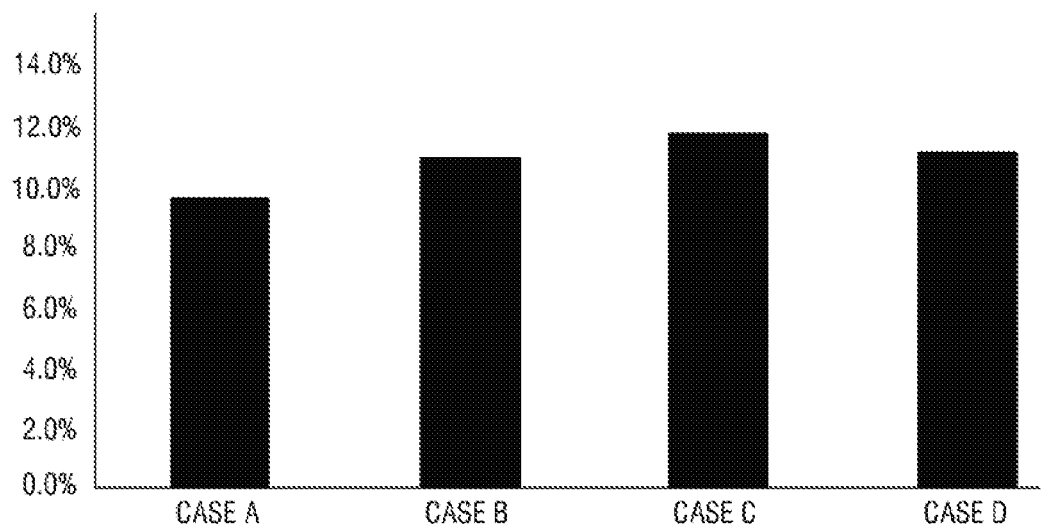
FIG. 5 illustrates experimental data obtained from a second model ship experiment to show the frictional resistance reducing effect of the frictional resistance reducing device according to the first embodiment of the present disclosure.

FIG. 5 illustrates experimental data obtained from a second model ship experiment to show the frictional resistance reducing effect of the frictional resistance reducing device according to the first embodiment of the present disclosure. The frictional resistance reducing effect of the frictional resistance reducing device 200 according to the first embodiment of the present disclosure will now be described with reference to FIG. 5.

In the second model ship experiment, the resistance of the model ship was measured when air was not discharged at all from the first air discharge part and the second air discharge part (reference case) and by varying the amount of air discharged from the second air discharge part while the amount of air discharged from the first air discharge part was kept constant (CASE A. CASE B. CASE C and CASE D).

In FIG. 5, the X-axis represents the experimental case, and the Y-axis represents the resistance reduction rate of the model ship in each case. Here, the frictional resistance reduction rate denotes the rate of decrease of the resistance measured in each case with respect to the resistance (hereinafter, referred to as reference resistance) measured in the reference case.

Referring to FIG. 5, the resistance reduction rate with respect to the reference resistance was 9.6% in CASE A, 10.8% in CASE B, 11.8% in CASE C. and 11% in CASE D. Here. CASE C shows the largest resistance reduction rate.

The second model ship experiment was repeatedly carried out by varying the amount of air discharged from the first air discharge part, and a case showing the largest resistance reduction rate in each round of the second model ship experiment was specified. The case showing the largest resistance reduction rate in each round had a commonality in that the amount of air discharged from the first air discharge part was smaller than or equal to the amount of air discharged from the second air discharge part.

The frictional resistance reducing device 200 (FIG. 1) according to the first embodiment of the present disclosure is based on the above experimental results and thus effectively reduces frictional resistance by making the amount of air discharged from the first air discharge part 210 smaller than or equal to the amount of air discharged from the second air discharge part 220 located behind the first air discharge part 210.

A distance D between the first air discharge part 210 and the second air discharge part 220 is smaller than or equal to 0.1 times a full length L of the hull 100. That is, 0<D≤0.1 L. If the distance D between the first air discharge part 210 and the second air discharge part 220 exceeds 0.1 times the full length L of the hull 100, the frictional resistance reducing effect is significantly reduced.

A width of each of the first air discharge part 210 and second air discharge part 220 is smaller than or equal to 0.5 times the width of the hull 100. If the width of each of the first air discharge part 210 and the second air discharge part 220 is greater than 0.5 times the width of the hull 100, the frictional resistance reducing effect is significantly reduced compared to the amount of air discharged. This results in reduced efficiency.

The width of the first air discharge part 210 is smaller than or equal to the width of the second air discharge part 220. If the width of the first air discharge part 210 is greater than the width of the second air discharge part 220, the frictional resistance reducing effect is significantly reduced compared to the amount of air discharged. This results in reduced efficiency.

In FIG. 1, one frictional resistance reducing device 200 according to the first embodiment of the present disclosure is provided. However, this is merely an example, and a plurality of frictional resistance reducing devices can be provided.

Figure 6:
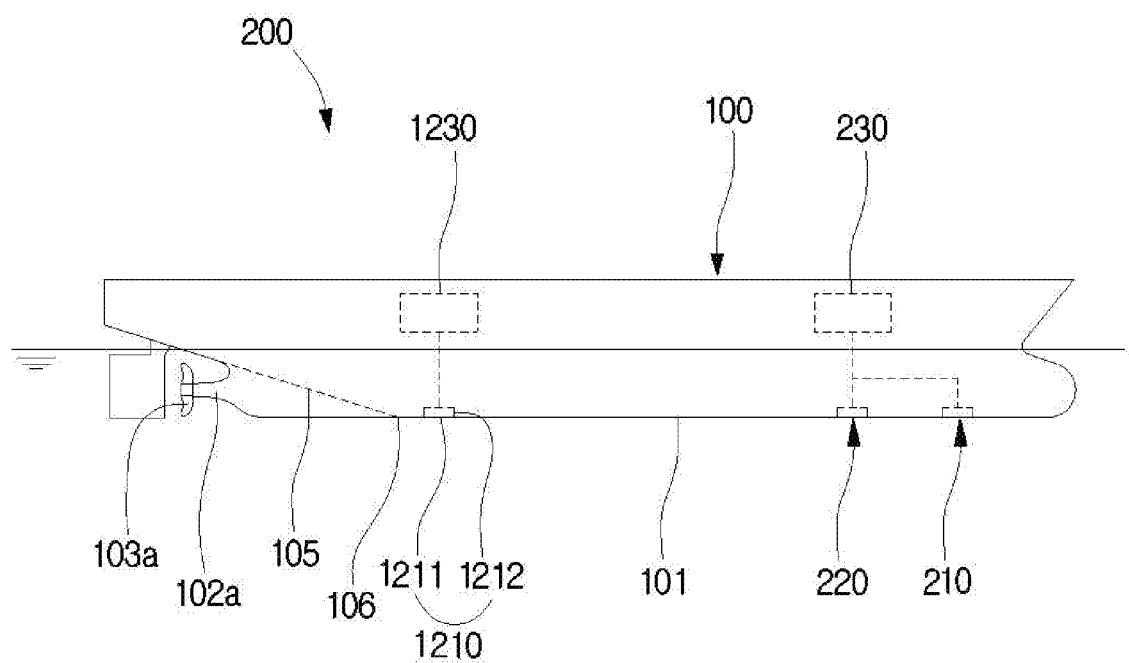
FIG. 6 is a side view of a ship equipped with a frictional resistance reducing device according to a third embodiment of the present disclosure.
Figure 7:
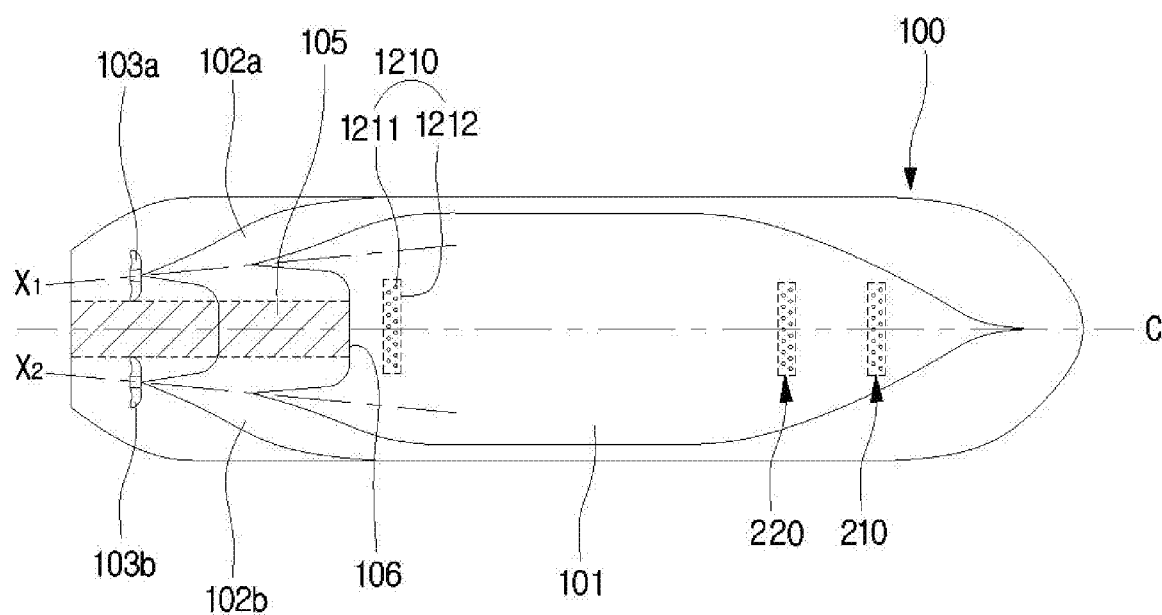
FIG. 7 is a bottom view of the ship equipped with the frictional resistance reducing device according to the third embodiment of the present disclosure.
Figure 8:
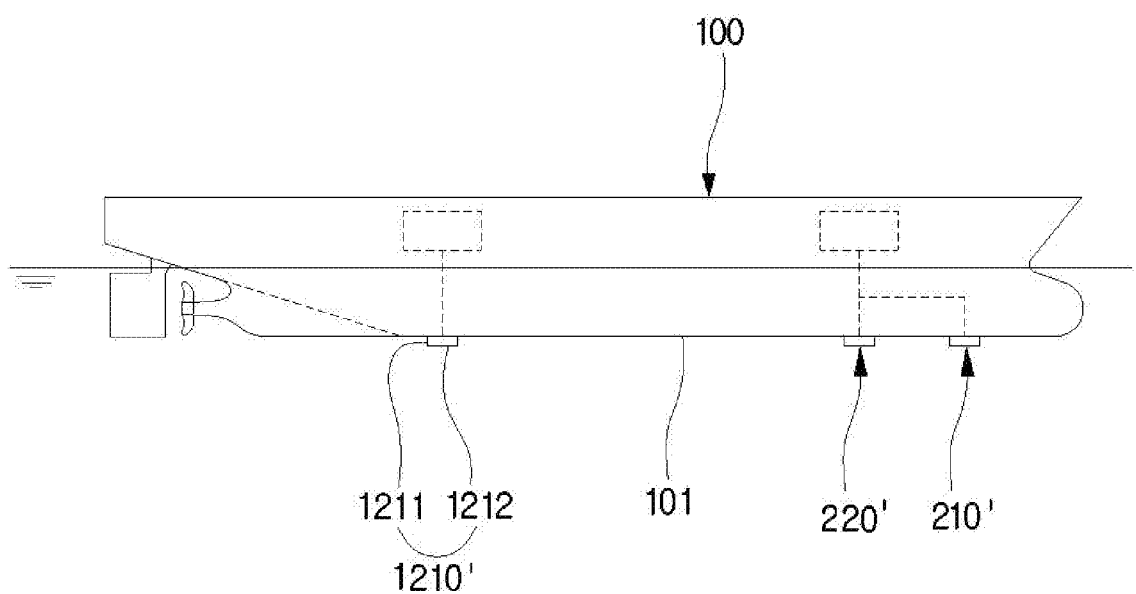
FIG. 8 is a side view of a ship equipped with a frictional resistance reducing device according to a fourth embodiment of the present disclosure.

FIG. 6 is a side view of a ship equipped with a frictional resistance reducing device according to a third embodiment of the present disclosure. FIG. 7 is a bottom view of the ship equipped with the frictional resistance reducing device according to the third embodiment of the present disclosure. FIG. 8 is a side view of a ship equipped with a frictional resistance reducing device according to a fourth embodiment of the present disclosure. For case of description, the following description will focus on differences from FIGS. 1 through 5.

Referring to FIGS. 6 and 7, the ship 10 according to the third embodiment of the present disclosure includes a hull 100 and the frictional resistance reducing device 200.

The hull 100 has twin skegs 102a and 102b, that is, a pair of skegs 102a and 102b. Propeller shafts (not illustrated) connected to propellers 103a and 103b are rotatably supported inside the twin skegs 102a and 102b, respectively.

A bottom surface 101 of the hull 100 may be flat.

A bottom inclined part 105 is formed in the hull 100. The bottom inclined part 105 is located between the twin skegs 102a and 102b and inclined upward toward a stem. The bottom inclined part 105 may extend rearward from a rear end of the flat bottom surface 101. In other words, the flat bottom surface 101 may extend forward from a front end of the bottom inclined part 105.

The frictional resistance reducing device 200 reduces the frictional resistance of the hull 100 by forming an air layer on an outer surface of the hull 100.

The frictional resistance reducing device 200 includes a third air discharge part 1210 and a second air supplying source 1230.

The third air discharge part 1210 is formed on the bottom surface of the hull 100. The third air discharge part 1210 is disposed closer to the stern than to a bow and discharges air between the twin skegs 102a and 102b. More specifically, the third air discharge part 1210 discharges air to the bottom inclined part 105. The discharged air forms an air layer on the bottom inclined part 105 to reduce the frictional resistance of the hull 100.

Here, the third air discharge part 1210 may be disposed in front of a boundary 106 between the bottom surface 101 and the bottom inclined part 105. In other words, the third air discharge part 1210 may be disposed in front of the front end of the bottom inclined part 105.

In this case, the air discharged from the third air discharge part 1210 as the hull 100 advances can easily move to the bottom inclined part 105, and an air layer can be formed from the front end of the bottom inclined part 105.

The third air discharge part 1210 may be disposed between the boundary 106 (or the rear end of the bottom surface 101) and a position located 1.5 stations forward from the boundary 106 (or the rear end of the bottom surface 101). Here, the term 'station' denotes a length obtained by dividing the full length of the hull 100 by 20. If the third air discharge part 1210 is located ahead of the position 1.5 stations away from the boundary 106 (or the rear end of the bottom surface 101), the air discharged from the third air discharge part 1210 cannot easily move to the bottom inclined part 105.

Alternatively, although not illustrated, the third air discharge part 1210 may be disposed at the front end of the bottom inclined part 105.

The third air discharge part 1210 may be disposed such that a longitudinal centerline C of the hull 100 passes through a widthwise center of the third air discharge part 1210. In this case, the air discharged from the third air discharge part 1210 may be distributed on the bottom inclined part 105 symmetrically with respect to the longitudinal centerline C of the hull 100.

A width of the third air discharge part 1210 may be smaller than a gap between the twin skegs 102a and 102b. Here, the gap between the twin skegs 102a and 102b denotes a gap between central axes of rotation $X_1$ and $X_2$ of the propellers 103a and 103b corresponding to the twin skegs 102a and 102b. In this case, the air discharged from the third air discharge part 1210 can efficiently move to the bottom inclined part 105 located between the twin skegs 102a and 102b and form an air layer.

The third air discharge part 1210 may include a plurality of air discharge holes 1211 and a chamber 1212.

The air discharge holes 1211 are distributed in the bottom surface 101 to be spaced apart from each other. The air discharge holes 1211 may be distributed in the width direction of the hull 100. The air supplied from the second air supplying source 1230, which will be described later, is discharged into water through the air discharge holes 1211.

The chamber 1212 is disposed inside the hull 100. The chamber 1212 may be disposed inside the hull 100 to cover the air discharge holes 1211. The air supplied from the second air supplying source 1230 flows into the chamber 1212 and is discharged into the water through the air discharge holes 1211.

Alternatively, referring to FIG. 8, a chamber 1212 constituting a third air discharge part 1210' may be disposed outside a hull 100. Here, the chamber 1212 may be coupled to a bottom surface 101. In this case, a plurality of air discharge holes 1211 may be formed in side surfaces of the chamber 1212, and an inlet for introducing air into the chamber 1212 may be formed in the bottom surface 101. In addition, various forms of third air discharge parts can be proposed.

Referring again to FIGS. 6 and 7, the second air supplying source 1230 supplies air to the third air discharge part 1210. The second air supplying source 1230 may be disposed inside the hull 100. The second air supplying source 1230 may include a compressor or a blower.

As illustrated in the drawings, the hull 100 may include two additional air discharge parts 210 and 220 (the first and second air discharge parts 210 and 210 of FIGS. 1 through 3) which discharge air to the bottom surface 101. However, this is merely an example, and one additional air discharge part or three or more additional air discharge parts can be formed.

At least part of a third air discharge period of the third air discharge part 1210 may overlap at least part of a first air discharge period of the first air discharge part 210 and at least part of a second air discharge period of the second air discharge part 220. That is, there is a period during which the first air discharge part 210, the second air discharge part 220, and the third air discharge part 1210 operate simultaneously. Alternatively, the first air discharge part 210, the second air discharge part 220, and the third air discharge part 1210 may always discharge air simultaneously. The operating periods of the first air discharge part 210, the second air discharge part 220 and the third air discharge part 1210 can vary depending on the design. In addition, the operating period of the first air discharge part 210, the operating period of the second air discharge part 220 and the operating period of the third air discharge part 1210 can be changed as necessary.

In addition, since the third air discharge part 1210 is disposed closer to the stern than to the bow, the second air supplying source 1230 may also be disposed closer to the stern than to the bow. In this case, an air supply pipe can be made short to facilitate the supply of air. In addition, since the third air discharge part 1210 is disposed close to the stern and the first air discharge part 210 and the second air discharge part 220 are disposed close to the bow, a first air supplying source 230 and the second air supplying source 1230 can be spaced apart from each other.

Figure 9:
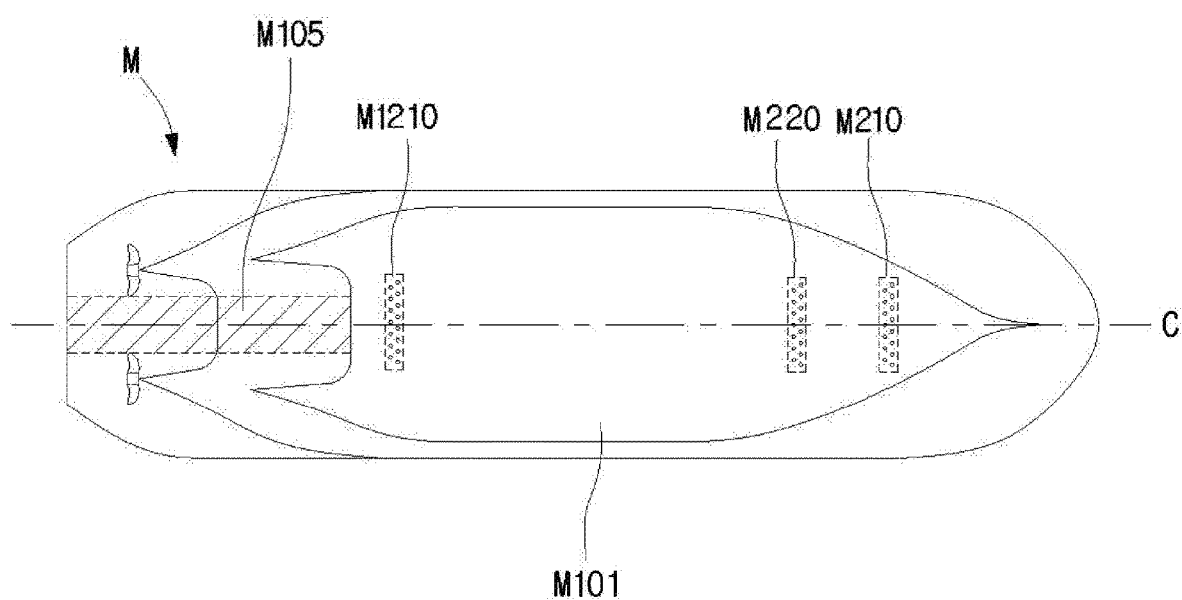
FIG. 9 is a bottom view of a model ship for explaining the frictional resistance reducing effect of the frictional resistance reducing device according to the third embodiment of the present disclosure.
Figure 10:
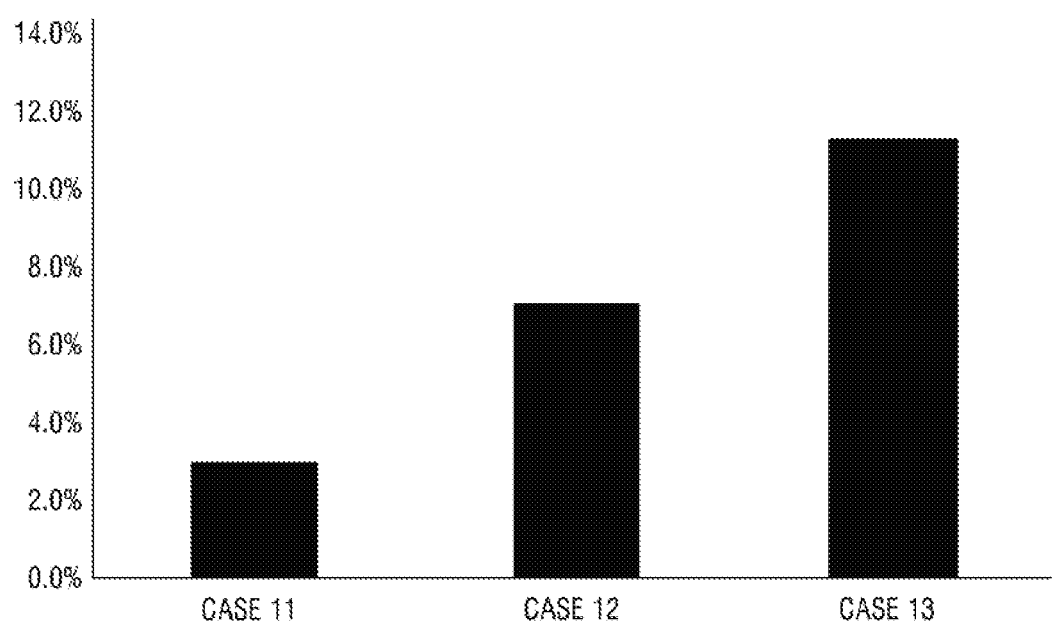
FIG. 10 illustrates experimental data for the model ship of FIG. 9.

FIG. 9 is a bottom view of a model ship for explaining the frictional resistance reducing effect of the frictional resistance reducing device according to the third embodiment of the present disclosure. FIG. 10 illustrates experimental data for the model ship of FIG. 9. The frictional resistance reducing effect of the frictional resistance reducing device 200 (see FIG. 6) according to the current embodiment will now be described with reference to FIGS. 9 and 10.

A first air discharge part M210, a second air discharge part M220 and a third air discharge part M1210 are formed on a bottom surface M101 of the model ship M. The first air discharge part M210 is formed at a rear end of the bottom surface 101, and the second air discharge part M220 and the third air discharge part M1210 are formed at a front end of the bottom surface.

In the model ship experiment, the resistance of the model ship was measured when air was not discharged at all (reference case), when air was discharged only from the third air discharge part M1210 (CASE 11), when air was discharged only from the first air discharge part M210 and the second air discharge part M220 (CASE 12), and when air was discharged from all of the first air discharge part M210, the second air discharge part M220 and the third air discharge part M1210 (CASE 13).

Here, the amount of air discharged in CASE 13 was equal to the sum of the amounts of air discharged in CASE 11 and CASE 12.

In FIG. 10, the X-axis represents the experimental case, and the Y-axis represents the resistance reduction rate in each experimental case. Here, the frictional resistance reduction rate denotes the rate of decrease of the resistance measured in each case with respect to the resistance (hereinafter, referred to as reference resistance) measured in the reference case.

Referring to FIGS. 9 and 10, the resistance reduction rate with respect to the reference resistance was 3% in CASE 11. In CASE 11, an air layer was predominantly formed on a bottom inclined part M105 between twin skegs of the model ship M. This air layer reduced the resistance in CASE 11 by 3% from the reference resistance.

In CASE 12, the resistance reduction rate with respect to the reference resistance was 7%.

In CASE 13, the resistance reduction rate with respect to the reference resistance was 11.5%. This figure is higher than 10% which is the sum of the 3% resistance reduction rate in CASE 11 and the 7% resistance reduction rate in CASE 12.

The above results indicate that the resistance reduction rate obtained when air is discharged from the third air discharge part M1210 and the first air discharge part M210 and the second air discharge part M220 located in front of the third air discharge part M1210 is equal to or higher than the resistance reduction rate obtained when air is discharged only from the third air discharge part M1210.

The friction resistance reducing device 200 (see FIG. 6) is based on the above experimental data. Therefore, the frictional resistance reducing device 200 forms an air layer on the bottom inclined part 105 (see FIG. 6) and the bottom surface 101 (see FIG. 6) by discharging air through the third air discharge part 1210 and the additional air discharge parts 210 and 220 located in front of the third air discharge part 1210, thereby effectively reducing the frictional resistance of the ship 10 (see FIG. 6) having a twin-skeg hull form.

It should be noted that experiments for verifying the frictional resistance reducing effect of the frictional resistance reducing devices 200 according to the embodiments of the present disclosure can be performed through numerical analysis.

While the present disclosure has been particularly shown and described with reference to exemplary embodiments thereof, it will be understood by those of ordinary skill in the art that various modifications and changes may be made therein through inclusion, alteration, removal or addition of elements without departing from the spirit and scope of the present disclosure as defined by the following claims.

DESCRIPTION OF REFERENCE CHARACTERS

10: ship
100: hull
101: bottom surface
102a, 102b: skeg
105: bottom inclined part
200: frictional resistance reducing device
210: first air discharge part
220: second air discharge part
230: air supplying source
1210: third air discharge part It is claimed:

1. A frictional resistance reducing device comprising:
a first air discharge part which is formed on a bottom surface of a hull and discharges air into water;
a second air discharge part which is formed behind the first air discharge part and discharges air into the water; and
a first air supplying source which supplies air to the first air discharge part or the second air discharge part,
wherein the first air discharge part and the second air discharge part are arranged in a line in a length direction of the hull, and at least part of a first air discharge period of the first air discharge part and at least part of a second air discharge period of the second air discharge part overlap each other, and
wherein the amount of air discharged from the first air discharge part is smaller than or equal to the amount of air discharged from the second air discharge part when air is discharged simultaneously from the first air discharge part and the second air discharge part.

2. The frictional resistance reducing device of claim 1, wherein a distance between the first air discharge part and the second air discharge part is smaller than or equal to 0.1 times a full length of the hull.

3. The frictional resistance reducing device of claim 1, wherein a width of the first air discharge part is smaller than or equal to a width of the second air discharge part.

4. The frictional resistance reducing device of claim 1, wherein the width of each of the first air discharge part and the second air discharge part is smaller than or equal to 0.5 times the width of the hull.

5. The frictional resistance reducing device of claim 1, wherein the first air discharge part and the second air discharge part are disposed closer to a bow than to a stern and further comprising a third air discharge part which is formed on the bottom of the hull, is disposed closer to the stern than to the bow and discharges air into the water.

6. The frictional resistance reducing device of claim 5, wherein at least part of a third air discharge period of the third air discharge part overlaps at least part of the first air discharge period and at least part of the second air discharge period.

7. The frictional resistance reducing device of claim 5, wherein the hull comprises twin skegs, and a width of the third air discharge part is smaller than a gap between the twin skegs.

8. The frictional resistance reducing device of claim 5, further comprising a second air supplying source which is spaced apart from the first air supplying source and supplies air to the third air discharge part.

9. A device for reducing frictional resistance of a hull having twin skegs, the device comprising:
a first air discharge part which is formed on a bottom surface of a hull and discharges air into water;
a second air discharge part which is formed behind the first air discharge part and discharges air into the water;
a first air supplying source which supplies air to the first air discharge part or the second air discharge part;
a third air discharge part which discharges air to form an air layer on a bottom inclined part located between the twin skegs and inclined upward toward a stern; and
a second air supplying source which supplies air to the third air discharge part,
wherein the amount of air discharged from the first air discharge part is smaller than or equal to the amount of air discharged from the second air discharge part when air is discharged simultaneously from the first air discharge part and the second air discharge part.

10. The device of claim 9, wherein the air discharge part is disposed ahead of a boundary between a bottom surface of the hull and the bottom inclined part.

11. The device of claim 9, wherein the air discharge part is disposed between a position located 1.5 stations forward from the boundary and the boundary.

12. The device of claim 9, wherein the air discharge part is disposed such that a longitudinal centerline of the hull passes through a widthwise center of the air discharge part, and a width of the air discharge part is smaller than a gap between the twin skegs.

13. The device of claim 9, wherein one or more additional air discharge parts which are disposed closer to a bow than to the stern of the hull and discharge air to form an air layer on the bottom surface of the hull are formed.

14. A ship comprising:
the frictional resistance reducing device of claim 1; and
a hull equipped with the frictional resistance reducing device.

* * * * *

UNITED STATES PATENT AND TRADEMARK OFFICE
CERTIFICATE OF CORRECTION

PATENT NO. : 10,562,593 B2
APPLICATION NO. : 15/780600
DATED : February 18, 2020
INVENTOR(S) : Jang et al.

Page 1 of 1

It is certified that error appears in the above-identified patent and that said Letters Patent is hereby corrected as shown below:

On the Title Page

Item (30): add priority information --Dec. 4, 2015 (KR)............... 10-2015-0172155--.

Signed and Sealed this
Sixth Day of October, 2020

Andrei Iancu
*Director of the United States Patent and Trademark Office*